(12) United States Patent
Shigeeda

(10) Patent No.: US 7,581,243 B2
(45) Date of Patent: Aug. 25, 2009

(54) SECURE COMMUNICATION METHOD, TERMINAL DEVICE, AUTHENTICATION SERVER, COMPUTER PROGRAM, AND COMPUTER-READABLE RECORDING MEDIUM

(75) Inventor: Nobuyuki Shigeeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 797 days.

(21) Appl. No.: 11/044,431

(22) Filed: Jan. 27, 2005

(65) Prior Publication Data
US 2005/0210253 A1   Sep. 22, 2005

(30) Foreign Application Priority Data
Jan. 30, 2004   (JP)   ............... 2004-023969

(51) Int. Cl.
*G06F 15/16*   (2006.01)
(52) U.S. Cl. ............... 726/3; 726/10; 380/44; 380/278
(58) Field of Classification Search ......... 380/277–280, 380/286, 44–47; 713/150, 153, 155, 159, 713/168–172, 175, 182–185; 726/2–5, 10, 726/17, 18, 21, 26–30
See application file for complete search history.

(56) References Cited

U.S. PATENT DOCUMENTS

| 5,418,854 | A | * | 5/1995 | Kaufman et al. ............ 713/156 |
| 5,535,276 | A | * | 7/1996 | Ganesan ..................... 713/155 |
| 5,590,199 | A | * | 12/1996 | Krajewski et al. .......... 713/159 |
| 5,602,915 | A | * | 2/1997 | Campana et al. ............ 380/277 |
| 5,677,954 | A | * | 10/1997 | Hirata et al. ................. 380/257 |
| 5,706,349 | A | * | 1/1998 | Aditham et al. ............. 713/159 |
| 6,064,736 | A | * | 5/2000 | Davis et al. .................. 713/155 |
| 6,178,508 | B1 | * | 1/2001 | Kaufman ..................... 713/183 |
| 6,286,008 | B1 | * | 9/2001 | Matsumoto et al. ......... 707/102 |
| 6,986,040 | B1 | * | 1/2006 | Kramer et al. ............... 713/155 |
| 2001/0005682 | A1 | * | 6/2001 | Terao et al. .................. 455/550 |
| 2001/0052083 | A1 | * | 12/2001 | Willins et al. ............... 713/201 |
| 2002/0034305 | A1 | * | 3/2002 | Noyama et al. ............. 380/282 |
| 2002/0150253 | A1 | * | 10/2002 | Brezak et al. ............... 380/281 |
| 2003/0093668 | A1 | * | 5/2003 | Multerer et al. ............. 713/161 |
| 2004/0128510 | A1 | * | 7/2004 | Larsen ........................ 713/171 |
| 2005/0071677 | A1 | * | 3/2005 | Khanna et al. ............... 713/201 |

OTHER PUBLICATIONS

Kohl, J. "RFC1510—The Kerberos Network Authentication Service (V5)," Sep. 1993, Digital Equipment Corporation.*

* cited by examiner

*Primary Examiner*—Kimyen Vu
*Assistant Examiner*—Darren Schwartz
(74) *Attorney, Agent, or Firm*—Canon U.S.A. Inc., I.P. Division

(57) ABSTRACT

A secure communication method is performed in a system including a terminal device and an authentication server. The terminal device has at least one service process supplying a service to other terminal devices and a user authentication process performing authentication of a user, which processes run on the terminal device. The authentication server has an encryption key of the service process, registered therein in advance. The secure communication method includes the steps of generating a secret key used for achieving secure communication between the service process and the user authentication process by the authentication server, the generation being performed independently of the user authentication process; and encrypting the generated secret key with the encryption key of the service process to transmit the encrypted secret key to the service process by the authentication server.

3 Claims, 7 Drawing Sheets

SECURE COMMUNICATION METHOD, TERMINAL DEVICE, AUTHENTICATION SERVER, COMPUTER PROGRAM, AND COMPUTER-READABLE RECORDING MEDIUM

BACKGROUND OF THE INVENTION

1. Field of the Invention

The present invention relates to a secure communication method, a terminal device, an authentication server, a computer program, and a computer-readable recording medium and, particularly, to encrypted communication of information. More particularly, the present invention relates to a method for ensuring the security of information communication between processes running on a common platform independent of the operating system (OS). Much more particularly, the present invention relates to a technique preferably used for security of authentication and information communication between service processes and prevention of manipulation in a secure printing function of a multifunction peripheral (MFP).

2. Description of the Related Art

In recent years, confidential information of various levels has been transmitted through communication networks along with progress in computer communication technologies. Such confidential information includes information on resident cards and registers in public offices. In companies, a variety of business confidential information is computerized and the information is shared over computer networks. In these backgrounds, it is extremely important to maintain the confidentiality of electronic information transmitted over networks.

In addition to maintenance of the confidentiality, appropriate countermeasures must be taken against, for example, manipulation of information or data corruption due to various attacks, because the value of the confidential information is lost if the confidential information cannot be utilized, if required.

In order to attain the above objects, encrypted communication methods, such as a secure socket layer (SSL) and a transport layer security (TLS), have been devised and put into practical use in information communication between computers that are client server systems.

In addition to these standard technologies, user authentication adopting a terminal management method, and a mechanism, for example, a Kerberos technology, which has a user authentication function and an encryption-key switching function for realizing the encrypted communication thorough communication channels, have also been devised and put into practical use.

The authentication server generates a secret key (Jk) for use in the encrypted communication between the client and the server in the above Kerberos technology, while the client generates the secret key (Jk) for use in the encrypted communication after the user authentication in some methods.

In the case of office equipment typified by the MFP, one terminal device has multiple functions including scanner, facsimile, printer, storage, and other functions, and the functions are coordinated with each other to attain a copier function or any of the functions can operate independently. In the MFP as a system, multiple service applications installed on a personal computer (PC) are coordinated with each other to communicate information between processes. As a result, some kind of information, for example, authentication information is transmitted to and received from the processes.

As described above, also in the information communication between the processes, multiple service applications run on a single terminal device to transmit and receive confidential information in a level different from that in the information communication between terminals in a client-server system.

Conventionally, in client-server systems, many countermeasures against the security problems including leakage and manipulation of information, described above, have been devised. In contrast, the information communication between service processes seems to be involved in the OS and, therefore, the security is undesirably considered only within the range of the OS.

However, recently, many technologies including JAVA have been developed in order to use a common platform. In this situation, the requirements for the security cannot necessarily be met in a restrictive condition, that is, within the range of the OS.

In other words, since a user can easily create an application independent of the OS and can easily install the application on a common platform, it is technically easy for the service processes provided in the above manner to leak highly confidential information.

The problem of vulnerability of the communication between multiple service processes on a common platform is caused not only in JAVA but also in a case in which information communication specifications designed as an international standard, like a Web service, are applied to multiple service processes. Accordingly, there is an urgent need to resolve such problems. Particularly, when information communication is performed in a standard level independent of the OS or the like, the above problems, which were capable of being resolved by applying the security functions inherent to the OS, cannot be easily resolved.

For example, secure printing in which an MFP does not start printing immediately after the user specifies the printing with his/her client terminal and transmits the print job to the MFP and the MFP restarts to process the print job after the user is authenticated in the MFP is assumed.

In this case, the MFP has a job management process that securely receives the print job and stores the received print job in a memory area in the MFP and a user authentication process that separately performs the user authentication in the MFP and instructs restart of the print job in accordance with the authentication result.

Accordingly, when the user specifies printing with his/her client terminal and transmits the print job to an MFP, the security of the print job must be ensured between the client terminal and the MFP. In addition, the user authentication process performed in the MFP and the transmission of information, such as process restart information used by the job management process to restart the print process based on the user authentication process, between the processes must be securely performed, as in the client-server communication.

As described above, there is a problem in that, in the multiple service applications running on a common platform independent of the OS, it is difficult to ensure the security of the information communicated between the processes of each of the service applications with conventional security functions dependent of the OSs.

Furthermore, when the secure printing function is performed in the MFP in which multiple service processes run and to which a service process can freely added later through a dynamic link, it is difficult to prevent security problem, such as spoofing of an illegal service application that meets the request to restart the suspended print job.

SUMMARY OF THE INVENTION

The present invention ensures the security of information communication between processes or cooperation of multiple applications, for example, of secure printing in which user authentication is involved in suspending and restarting of the print job.

According to one aspect, the present invention provides a secure communication method performed in a system including a terminal device and an authentication server. The terminal device has at least one service process supplying a service to other terminal devices and a user authentication process performing authentication of a user, which processes run on the terminal device. The authentication server has an encryption key of the service process registered therein in advance. The secure communication method includes the steps of generating a secret key used for achieving secure communication between the service process and the user authentication process by the authentication server, the generation being performed independently of the user authentication process; and encrypting the generated secret key with the encryption key of the service process to transmit the encrypted secret key to the service process by the authentication server.

According to another aspect, the present invention provides a secure communication method performed in a system in which an authentication server provides an authentication service to a terminal device including at least one service process and a user authentication process performing authentication of a user. The authentication service includes the steps of generating a secret key based on a user password and a random number registered in advance in response to a request of the user; generating an access ticket specific to the user based on the secret key generated in the secret key generating step and access control information specific to the user; encrypting the access ticket generated in the access ticket generating step with an encryption key of the service process or a digital certificate; and transmitting the access ticket encrypted in the encrypting step and the generated random number to the user authentication process.

According to another aspect, the present invention provides an authentication server providing an authentication service to a terminal device including at least one service process and a user authentication process performing authentication of a user. The authentication server includes a secret-key generating unit for generating a secret key based on a user password and a random number registered in advance in response to a request of the user, in the authentication service; an access-ticket generating unit for generating an access ticket specific to the user based on the secret key generated by the secret-key generating unit and access control information specific to the user, in the authentication service; an encryption unit for encrypting the access ticket generated by the access-ticket generating unit with an encryption key of the service process or a digital certificate, in the authentication service; and a transmission unit for transmitting the access ticket encrypted by the encryption unit and the generated random number to the user authentication process, in the authentication service.

According to another aspect, the present invention provides a terminal device including at least one service process and a user authentication process performing authentication of a user. The terminal device includes a secret-key generating unit for generating a secret key based on a user password input by the user and a random number received from an authentication server, in the user authentication process; an encryption unit for encrypting secret information based on the secret key generated by the secret-key generating unit, in the user authentication process; and a transmission unit for appending an encrypted access ticket received from the authentication server to the secret information encrypted by the encryption unit to transmit the appended encryption information to the corresponding service process, in the user authentication process.

According to another aspect, the present invention provides a computer program causing a computer to perform a secure communication method in an authentication server that provides an authentication service to a terminal device including at least one service process and a user authentication process performing authentication of a user. The secure communication method includes the steps of generating a secret key based on a user password and a random number registered in advance in response to a request of the user; generating an access ticket specific to the user based on the secret key generated in the secret key generating step and access control information specific to the user; encrypting the access ticket generated in the access ticket generating step with an encryption key of the service process or a digital certificate; and transmitting the access ticket encrypted in the encrypting step and the generated random number to the user authentication process.

According to another aspect, the present invention provides a computer program causing a computer to perform secure communication in a terminal device including at least one service process and a user authentication process performing authentication of a user. The computer program includes codes for causing the computer to perform the steps of generating a secret key based on a user password input by the user and a random number received from an authentication server, in the user authentication process; encrypting secret information based on the secret key generated in the secret key generating step, in the user authentication process; and appending an encrypted access ticket received from the authentication server to the secret information encrypted in the secret information encrypting step to transmit the appended encryption information to the corresponding service process, in the user authentication process.

According to another aspect, the present invention provides a computer-readable recording medium recording the computer program causing the computer to perform the secure communication method in the authentication server.

Further features and advantages of the present invention will become apparent from the following description of exemplary embodiments with reference to the attached drawings.

DESCRIPTION OF THE EMBODIMENTS

Embodiments of the present invention are described in detail below with reference to the attached drawings.

An example of the operating environment of an interprocess secure communication system according to an embodiment of the present invention is described next with reference to FIG. 6.

Figure 6:
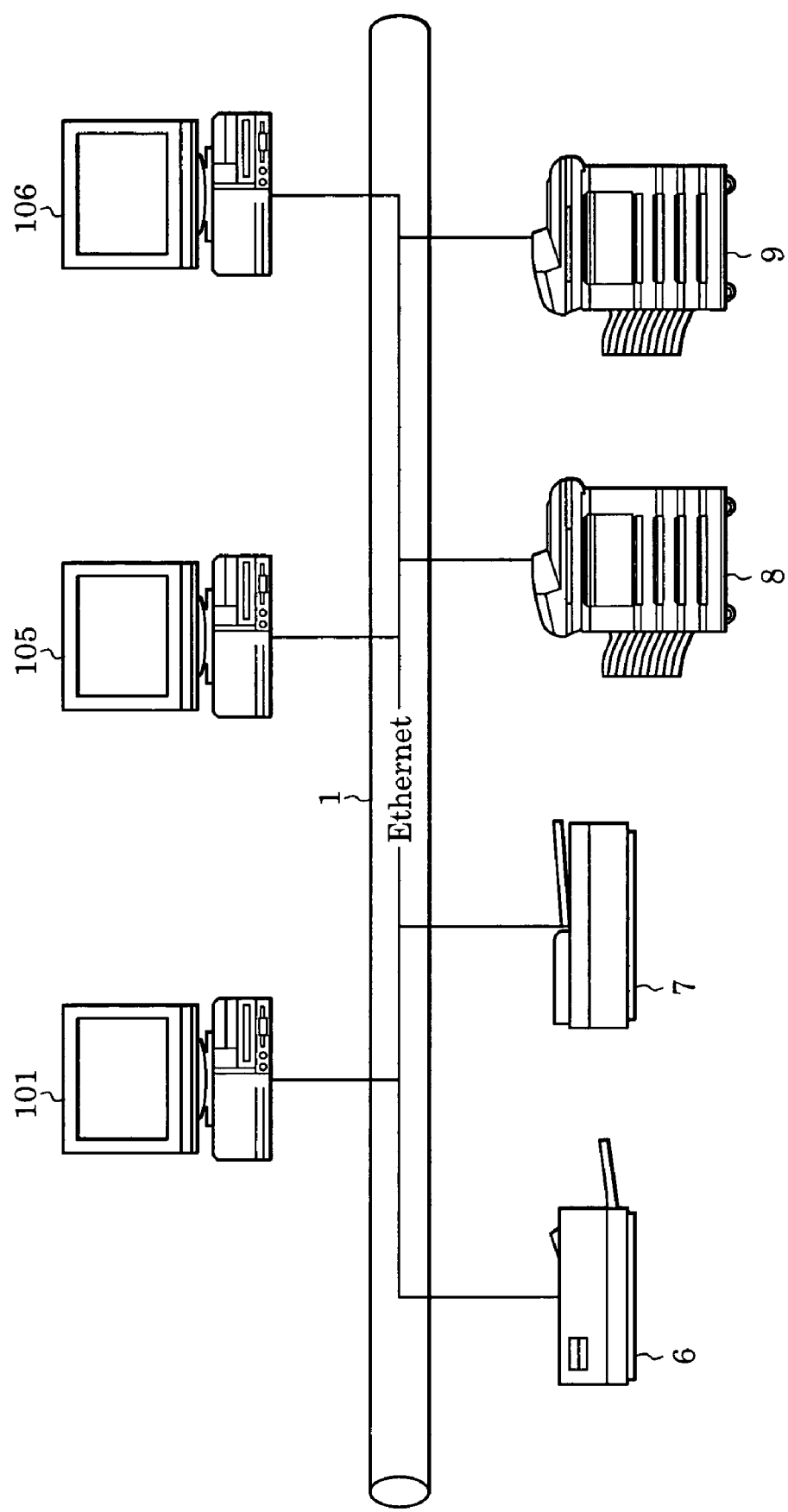
FIG. 6 shows an example of the operating environment where an interprocess secure communication system according to an embodiment of the present invention operates.

FIG. 6 shows an example of the operating environment where the interprocess secure communication system according to this embodiment operates.

Referring to FIG. 6, a physical layer of a network 1 is, for example, an Ethernet® or LocalTalk®. It is assumed in this embodiment that the physical layer of the network 1 is the Ethernet®.

The word "network" in this embodiment indicates at least one of a physical cable, electrical signals transmitted through the cable, and a protocol for information exchange realized by any combination of the electrical signals. Ordinarily, the "network" collectively means the physical cable, the electrical signals, and the protocol.

Referring back to FIG. 6, an authentication server 101 authenticates a printer 6, a network scanner 7, and multifunction peripherals 8 and 9. Client terminals 105 and 106 are personal computers that are connected to the network 1 and that are used by general users. Although two client terminals 105 and 106 are shown in FIG. 6, any number of client terminals may be connected to the network 1. The printer 6 and the network scanner 7 are connected to the network 1 and perform printing in accordance with a print request received from the client terminals 105 and 106.

The multifunction peripherals 8 and 9 each have an image scanning function, a printing function, and a facsimile function. Each of the multifunction peripherals 8 and 9 serves as a copier, a printer, a scanner, and/or a facsimile machine by using one of these functions or by combining any of these functions.

An example of the structure of a computer system used in each terminal device is described next with reference to FIG. 7.

Figure 7:
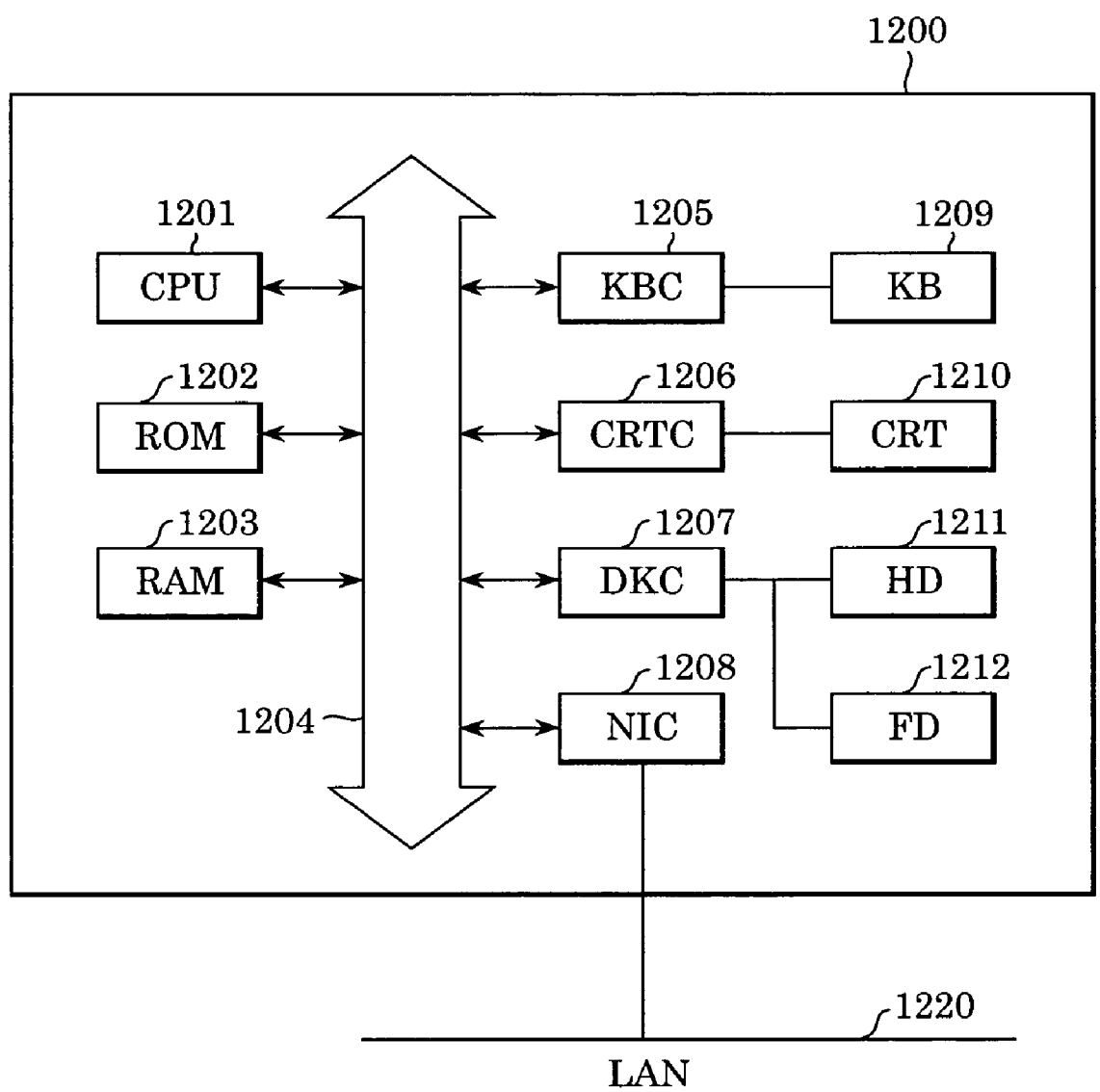
FIG. 7 is a block diagram showing an example of the structure of a computer system used in a terminal device.

Referring to FIG. 7, a personal computer 1200 includes a central processing unit (CPU) 1201. The CPU 1201 executes device control software that is stored in a read only memory (ROM) 1202 or a hard disk (HD) 1211 or that is supplied from a flexible disk (FD) 1212, and comprehensively controls each device connected to a system bus 1204.

Programs stored in the CPU 1201, the ROM 1202, or the HD 1211 perform functions according to this embodiment.

The personal computer 1200 also includes a random access memory (RAM) 1203 functioning as a main memory or a work area of the CPU 1201. The personal computer 1200 further includes a keyboard controller (KBC) 1205 for controlling supply of signals input with a keyboard (KB) 1209 to the personal computer 1200; a display controller (CRTC) 1206 for controlling display on a display device (cathode ray tube) (CRT) 1210; and a disk controller (DKC) 1207 for controlling access to the HD 1211 and the FD 1212, which store a boot program (program for activating the hardware of the personal computer 1200 or starting execution of software in the personal computer 1200), multiple applications, edit files, user files, network management programs, and so on.

The personal computer 1200 further includes a network interface card (NIC) 1208 used in two-way data communication with network printers, other network devices, or other personal computers through a local area network (LAN) 1220.

A communication method according to an embodiment of the present invention is described next.

Figure 1:
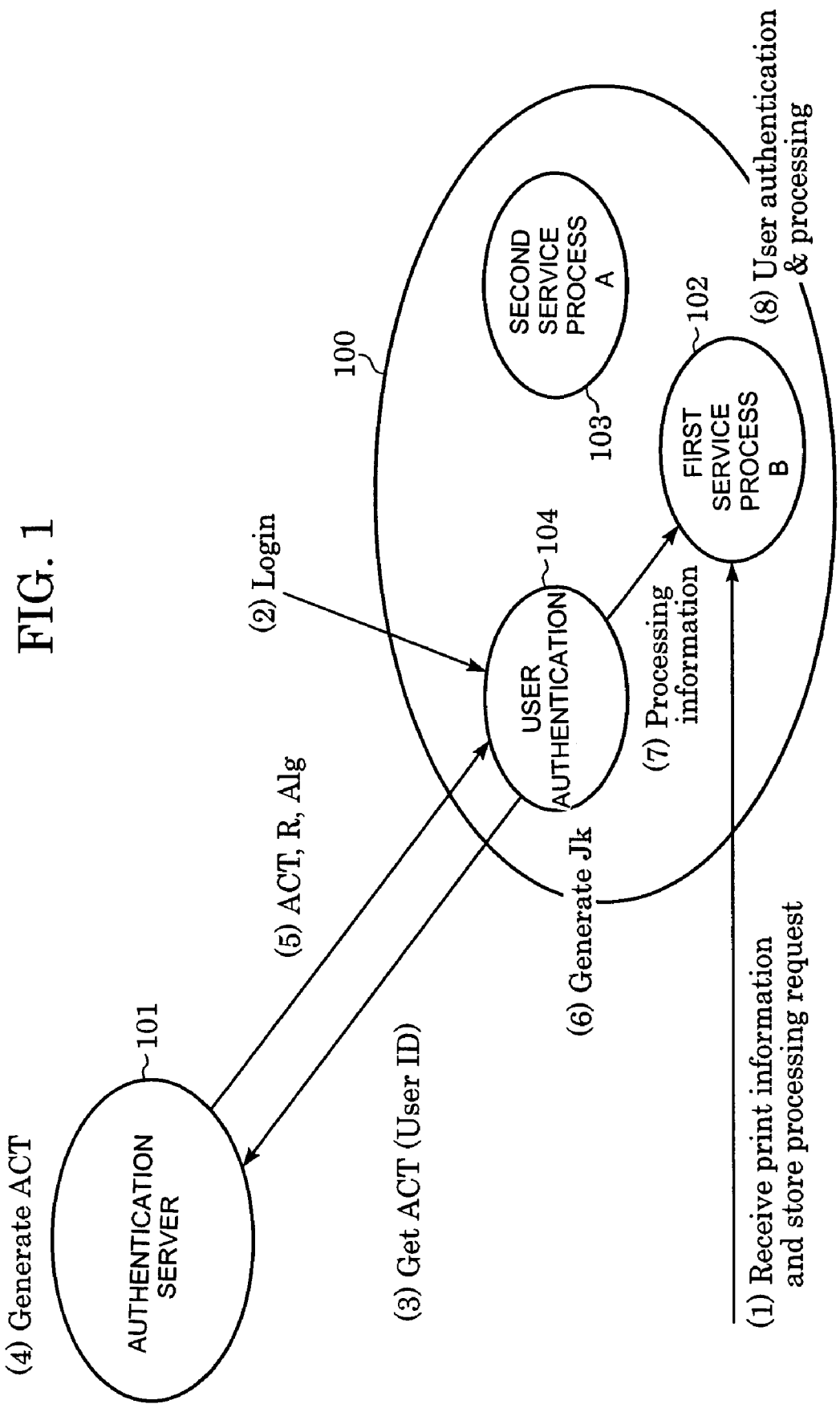
FIG. 1 shows an example of the functional structure of an interprocess secure communication system according to an embodiment of the present invention.

FIG. 1 shows an example of the functional structure of the interprocess secure communication system according to this embodiment of the present invention.

Referring to FIG. 1, a terminal device 100 is embodied in various modes including the printer 6 having a print server function, the network scanner 7, the multifunction peripherals 8 and 9 having a network connection function, which are shown in FIG. 6, a file server (not shown), and a Web server (not shown). Each of these functions (services) has at least one process. When the terminal device 100 is the multifunction peripheral 8 or 9 having multiple functions, a plurality of service processes operate on the multifunction peripheral 8 or 9.

A user authentication process 104 for authenticating login to the client terminal 105 (or 106) operated by a user and a first service process B 102 and a second service process A 103, which are main functions of the terminal device 100, run in the terminal device 100 of this embodiment.

Each of the first service process B 102 and the second service process A 103 is, for example, a secure printing process for supplying a secure print service or a storage process for supplying a storage service. According to this embodiment, the first service process B 102 functions as the secure printing process.

Referring to FIG. 1, an authentication server 101 manages user authentication information or access control information specific to the user as user information. The authentication server 101 has a function of collectively performing user authentication and access control to resources.

Since a variety of processing performed by the user through the user authentication in the client terminal 105 (106), that is, the printing process according to this embodiment, is not a main part of the present invention, the description of such operations is omitted here. Referring to FIG. 1, a process and information flow for transmitting print information from the client terminal 105 (106) to the terminal device 100 is shown by an arrow (1) Receive print information and store processing request.

According to this embodiment, secure printing is described. The secure printing means a function of temporarily storing data in a predetermined storage area in the terminal device 100, instead of immediately printing the data, after the terminal device 100 receives the print data, and restarting the printing after the user authentication and a process of restarting the printing are performed in the terminal device 100.

The purpose of the secure printing is to counter the threat of leakage of the content of a document into an unintended person or stealing of the document after the user prints the document and the printed document is output from the multifunction peripheral 8 or 9 as a print.

Figure 2:
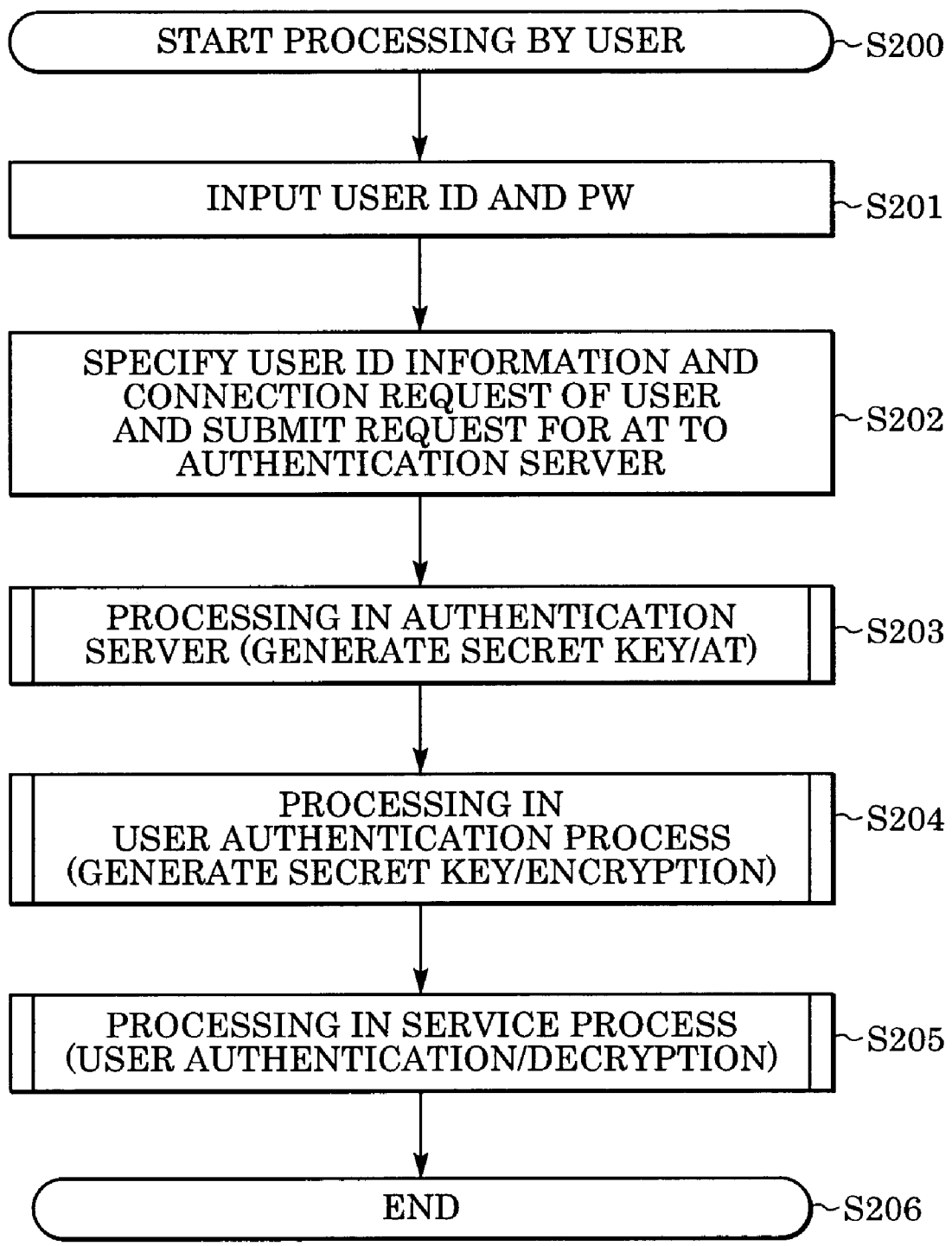
FIG. 2 is a flowchart showing an overall process performed at the server side of the interprocess secure communication system of this embodiment.

FIG. 2 is a flowchart showing an overall process performed at the server side of the interprocess secure communication system of this embodiment. As described above, the user login authentication and the process of performing printing have been finished in the client terminal 105 (106), and the print job has been transferred to the terminal device 100 by predetermined security means and has been stored in the terminal device 100.

Referring to FIG. 2, in Step S200, the user starts a process for restarting the printing process on the operation panel of the terminal device 100. In Step S201, the user logs in (shown by (2) Login in FIG. 1) and inputs a "User identification (ID)" and a "password PW" in order to be subjected to the user authentication on the operation panel of the terminal device 100. At this point, the user authentication process 104 running on the terminal device 100 receives a sequence of processes relating to the user authentication and performs the processes.

In Step S202, the user authentication process 104 specifies the "User ID" and the information on service process which the user wants to use and submits a request for issuing an access ticket AT (shown by (3) Get ACT (User ID) FIG. 1) to the authentication server 101.

In Step S203, the authentication server 101 receives the request for issuing the access ticket AT submitted from the user authentication process 104 and performs user authentication. In this user authentication, generation of a secret key (Jk) in the authentication server 101 and generation of the access ticket AT (shown by (4) Generate ACT in FIG. 1) are mainly performed. In order to generate the secret key (Jk), the authentication server 101 generates its own random number R. The generated access ticket AT, which includes the generated secret key (Jk) and the access control information (the processing right to the data) specific to the user, is encrypted with a key of the first service process B 102 (secure printing process) and is transmitted to the user authentication process 104 along with the random number R generated in advance. As described below, information Alg that specifies an algorithm for generating the secret key (Jk) or an encryption algorithm with the secret key (Jk) may also be transmitted (shown by (5) ACT, R, Alg in FIG. 1).

The secret key (Jk) generated by the authentication server 101 is completely discarded in the authentication server 101 after a sequence of processing requests to the user authentication process 104 is met. The purpose of the discard is to improve the performance of the request for processing the access ticket AT in the authentication server 101 and to reduce vulnerability including leakage of the secret key (Jk).

In Step S204, the user authentication process 104 generates its own secret key (Jk) by using the random number R and the password PW input by the user in advance (shown by (6) Generate Jk in FIG. 1) after the user authentication process 104 receives the random number R and the encrypted access ticket AT. An algorithm for generating the secret key (Jk) may be specified by the authentication server 101 that transmits the information Alg to the user authentication process 104 in response to the request for issuing the access ticket AT to the authentication server 101 or may be determined in advance and implemented in the system.

In Step S204, the user authentication process 104 encrypts secret information to be transmitted to the secure printing process 102 with the secret key (Jk) which the user authentication process 104 generates. An algorithm for encrypting the secret information may also be specified by the authentication server 101 for the user authentication process 104 in the generation of the access ticket AT or may be implemented in the system in advance.

The secret information here means information indicating the content of a processing request to the service process when access to the service process is permitted as a result of the user authentication. The secret information is, for example, information in use for requesting restart of the suspended print job.

After the user authentication process 104 encrypts the secret information by using a predetermined encryption algorithm, the user authentication process 104 appends the access ticket AT received from the authentication server 101 along with the random number R to the encrypted secret information and transmits the appended information to the secure printing process 102 as processing information (shown by (7) Processing information in FIG. 1). In the appending of the encrypted access ticket AT to the encrypted secret information, a predetermined delimiter may be inserted so as to indicate the position where the data joining is performed or may select a mechanism for storing the information on the data size in a header of the transmitted data.

In Step S205, the secure printing process 102 receives the encrypted processing information and extracts the encrypted access ticket AT from the received information. The encrypted access ticket AT has been encrypted in advance in the authentication server 101 with an encryption key of the secure printing process 102. The secure printing process 102 decrypts the encrypted access ticket AT with its own key to extract the access ticket AT.

The secret key (Jk) generated in advance by the authentication server 101 is stored in the access ticket AT. The secure printing process 102 decrypts, with the stored secret key (Jk), the encoded data that is encrypted by the user authentication process 104 with its own secret key (Jk) and that is transmitted to the secure printing process 102, and tries to perform the user authentication and processing (shown by (8) User authentication & processing in FIG. 1).

The secure printing process 102 can determine whether the user is properly authenticated by the authentication server 101 based on the determination of whether the decryption succeeds. If the decryption fails, it is supposed that the secret key (Jk) that is stored in the access ticket AT and that is generated by the authentication server 101 is different from the secret key (Jk) generated by the user authentication process 104. As a result, the user is not an intended user for the authentication server 101.

In contrast, if the decryption succeeds, it is supposed that the user authentication succeeds. A checksum included in the encryption data can be used to determine whether the decryption succeeds. Since a method in which the checksum is used to determine whether the decryption succeeds can be realized by using technical ideas included in various common encryption algorithms, a detailed description of such a method is omitted here.

If the decryption succeeds, the secure printing process 102 can determine a processing right of the user to the data received as the encrypted secret information based on other information in the access ticket AT, that is, the access control information. The secure printing process 102 continues to process the decrypted secret information based on the determined processing right of the user.

In other words, in Step S205, the secure printing process 102 determines which job is restarted among the suspended print jobs and restarts the printing of the determined job. In Step S206, the process of restarting the printing process is finished. In order to ensure the security of the system, an audit process for storing the content of the processing in a log may follow the reception of the secret information or the processing of the jobs, performed in other service processes in the terminal device 100.

The processing of the request for issuing the access ticket AT in the authentication server 101 (Step S203) is described in detail next with reference to FIG. 3.

Figure 3:
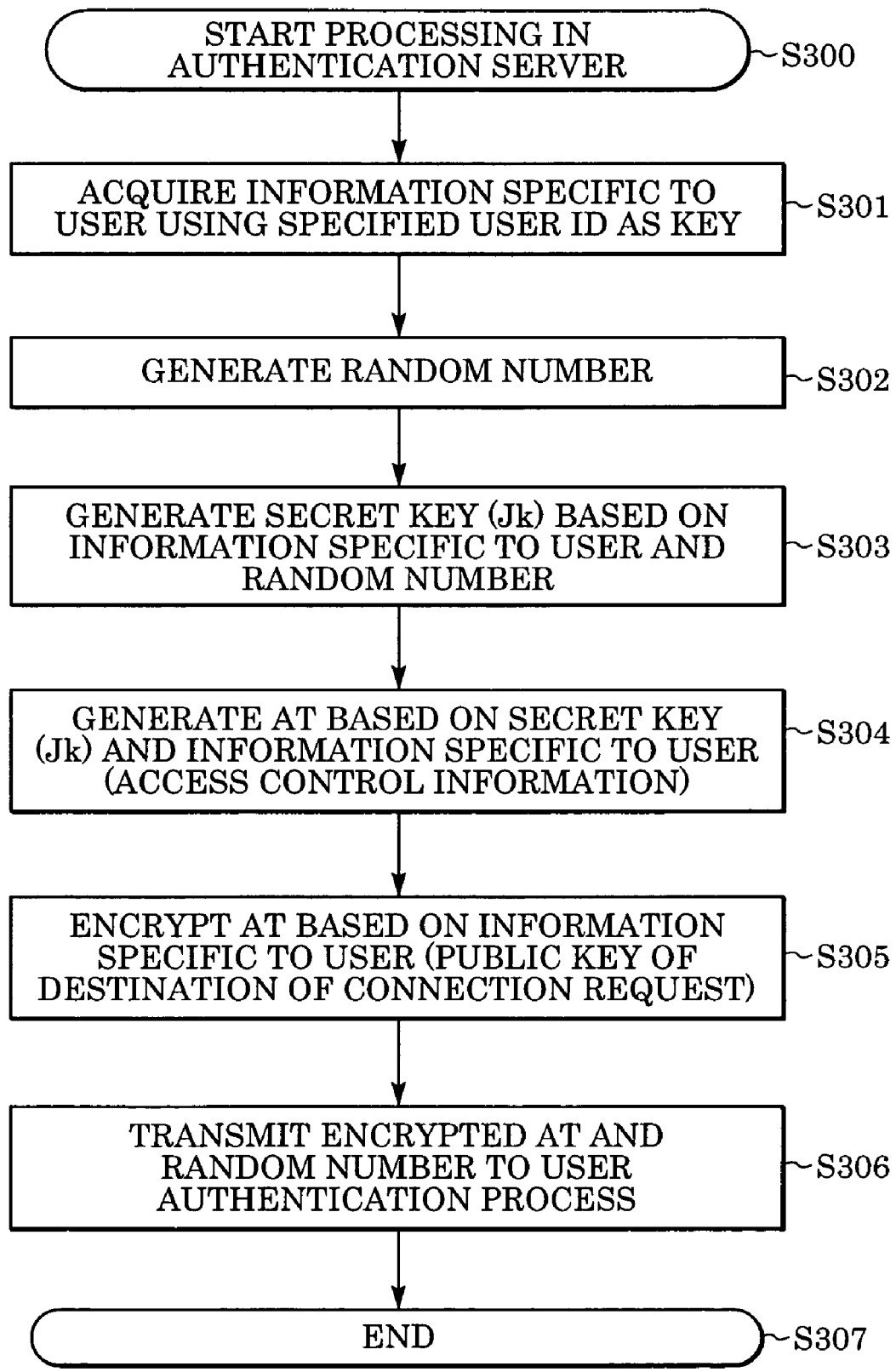
FIG. 3 is a flowchart showing in detail a process of requesting an access ticket in an authentication server.

In Step S300, the authentication server 101 starts the process in the flowchart in FIG. 3 after receiving the request for issuing the access ticket AT from the user authentication process 104.

The authentication server 101 receives the User ID information used for identifying the user and information indicating which resource (service process) the access request is submitted to, along with the request for issuing the access ticket AT from the user authentication process 104. In Step S301, the authentication server 101 acquires the information specific to the user using the received User ID as a key. The information specific to the user includes the information on the password PW of the user and the access control information to the resource.

The authentication server 101 may store the information specific to the user in its own database (DB), or may store the information in a reliable lightweight directory access protocol (LDAP) server or the like and may acquire the information through a secure negotiation process with the authentication server 101.

In Step S302, the authentication server 101 generates its own random number. The random number is used for generating the secret key (Jk) utilized in the encryption of the secret information between processes.

In Step S303, the authentication server 101 acquires the password PW information from the acquired information specific to the user and generates its own secret key (Jk) using the password PW information and the random number. An algorithm for generating the secret key (Jk) is specified in advance by the authentication server 101 or is determined in advance on implementation of the system. Since the user authentication process 104 must know the used algorithm when the algorithm is specified by the authentication server 101, the authentication server 101 indicates the information on the algorithm to the user authentication process 104.

The information specific to the user includes information concerning the access right of the user to the resource. In Step S304, the authentication server 101 generates the access ticket AT such that the access ticket AT includes the information concerning the access right of the user and the generated secret key (Jk). Since the format of the access ticket AT is determined for every implementation, a detailed description of the format of the access ticket AT is omitted here. In addition to the information on the access right of the user and the secret key (Jk), an encryption algorithm used in the encryption of the secret information by the user authentication process 104 is specified in the access ticket AT.

The request for issuing the access ticket AT from the user authentication process 104 includes information which resource (service process) the user authentication process 104 wants to access to. Accordingly, the authentication server 101 searches for the encryption key of the corresponding resource by using the information concerning the target resource as a key to acquire the encryption key. The authentication server 101 may store the encryption key in its own DB or may store the encryption key in an LDAP server, as in the information specific to the user.

In Step S305, the authentication server 101 encrypts the access ticket AT using the acquired encryption key of the resource. The access ticket AT is encrypted on the assumption that all terminals and devices, including the user authentication process 104, through which the access ticket AT is transmitted can be threats because the access ticket AT is transmitted to the target resource through the user authentication process 104, instead of being directly transmitted to the target resource.

In Step S306, the authentication server 101 transmits the encrypted access ticket AT, along with the generated random number and the algorithm for generating the secret key (Jk), if required, to the user authentication process 104. Although not shown in the flowchart in FIG. 3, the secret key (Jk) generated by the authentication server 101 is completely discarded in the final stage of the processing of the request for issuing the access ticket AT. Then, in Step S307, the process in the authentication server 101 is finished.

The secret key (Jk) generated by the authentication server 101 is completely discarded, as described above, because the authentication server 101 receives the requests for issuing the access ticket AT from the multiple user authentication processes. In this situation, managing the secret key (Jk) for every request can reduce the performance. In addition, the management of the secret key (Jk) can increase the vulnerability in the security.

The process in the user authentication process 104 (Step S204) is described in detail next with reference to FIG. 4.

Figure 4:
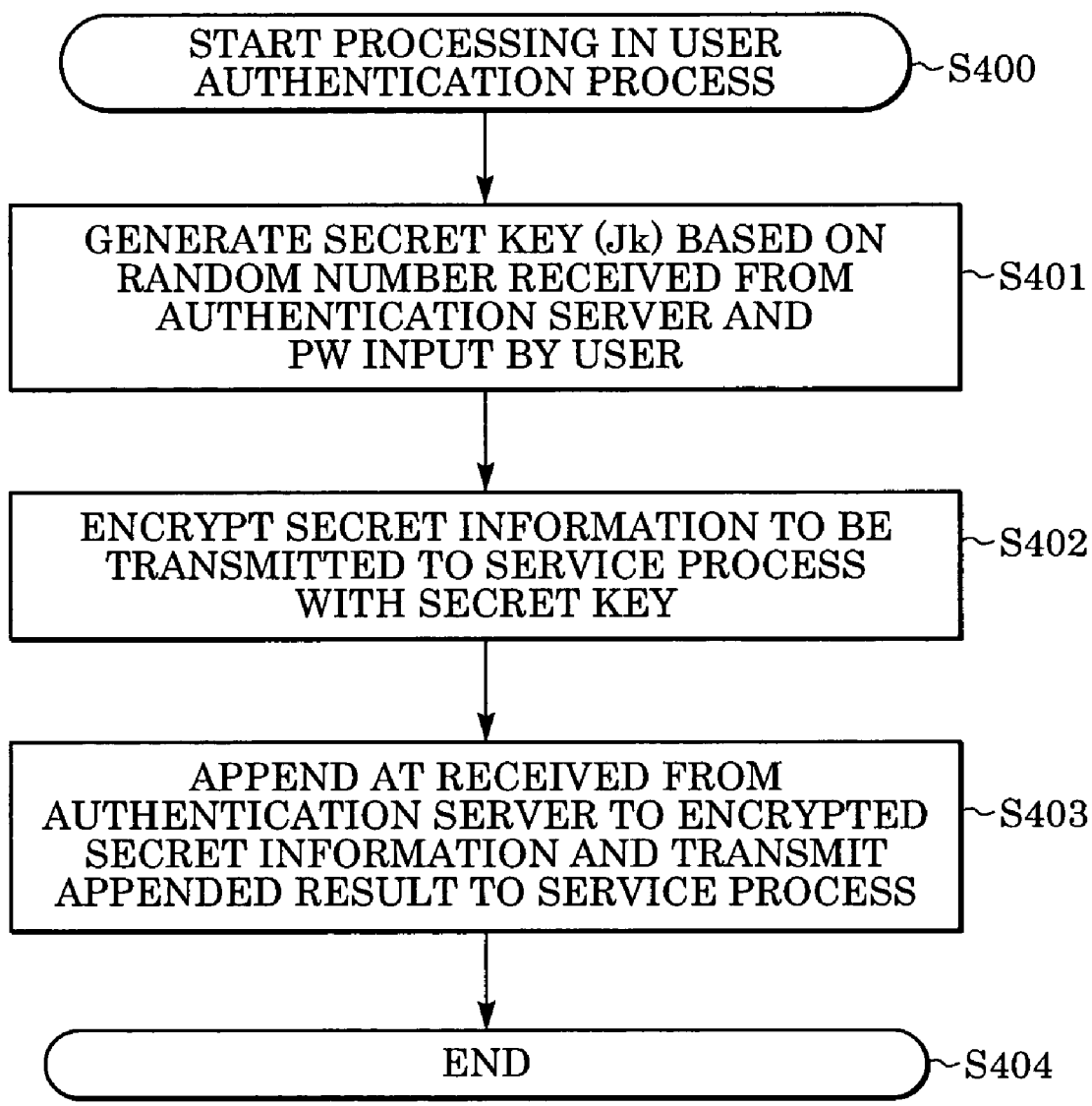
FIG. 4 is a flowchart showing in detail a process in a user authentication process after the request for issuing the access ticket is processed.

FIG. 4 is a flowchart showing the process in the user authentication process 104 after the processing of the request for issuing the access ticket AT is finished. After the user inputs the User ID and the password PW in the user authentication process 104, specifies the service process to which the user wants to access, and submits the request for issuing the access ticket AT to the authentication server 101, the user authentication process 104 receives the access ticket AT from the authentication server 101.

After the user authentication process 104 receives the random number and the information concerning the encryption algorithm, if required, in addition to the access ticket AT, from the authentication server 101, then in Step S400, the process in the user authentication process 104 is started. The user authentication process 104 holds the password PW input by the user in advance. In Step S401, the user authentication process 104 generates a secret key (Jk) based on the password PW and the random number received from the authentication server 101. An algorithm for generating the secret key (Jk) may be specified by the authentication server 101.

The user authentication process 104 generates its own secret key (Jk) using the random number, transmitted from the authentication server 101, and the password PW, directly input in the user authentication process 104 by the user on the operation panel of the terminal device 100, as basic information. Although the authentication server 101 generates its own secret key (Jk), the authentication server 101 does not transmit the information concerning its own secret key (Jk) to the user authentication process 104.

Since the access ticket AT issued by the authentication server 101 is encrypted with the encryption key of the secure printing process 102, the user authentication process 104 cannot determine the content of the access ticket AT. Since the information concerning the password PW is not transmitted from the authentication server 101, the user authentication process 104 acquires the password PW directly input in the user authentication process 104 by the user. In other words, in the generation of the secret key (Jk), the user authentication process 104 is completely independent of the authentication server 101. This relates to a process of inferring the user authentication in the secure printing process 102, described below.

In Step S402, the user authentication process 104 encrypts the secret information to be transmitted to the secure printing process 102 with the secret key (Jk) generated in advance. According to this embodiment, the secret information corresponds to information used for requesting restart of the suspended print job.

The series of operations, including the generation of the secret key (Jk), the generation of the request for restarting the suspended print job, and the encryption of the request for restarting the print job, are integrally performed in the user authentication process 104. Accordingly, even when another malicious service process submits the request for restarting the print job, any security problem is not caused in the encryption in the secure printing process 102.

After the user authentication process 104 encrypts the secret information, in Step S403, the user authentication process 104 appends the access ticket AT received from the authentication server 101 to the encryption data and transmits the encryption data to the secure printing process 102.

Since the access ticket AT and the secret information are integrally encrypted and the secure printing process 102, which receives the encryption data, cannot determine the boundary between the access ticket AT and the secret information, the user authentication process 104 inserts a predetermined delimiter in the boundary or stores the data size of the access ticket AT or the secret information in a header of the transmitted data so that the secure printing process 102 can determine the boundary. The used method is dependent on the implementation specifications of the system. After the user authentication process 104 transmits the encryption data to the secure printing process 102, in Step S404, the process in the user authentication process 104 is finished.

Figure 5:
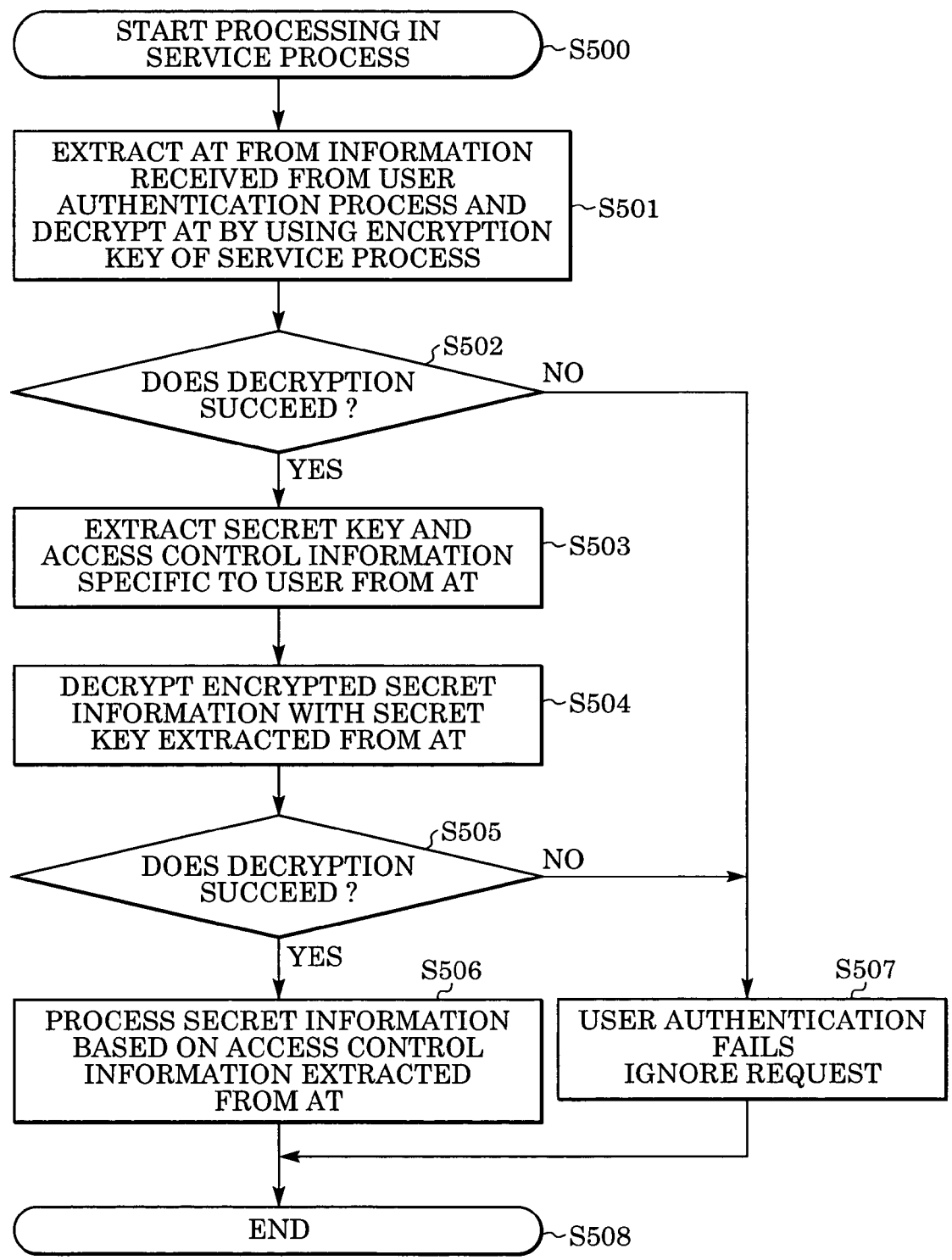
FIG. 5 is a flowchart showing in detail a process in a secure printing process after the secure printing process receives encrypted data.

FIG. 5 is a flowchart showing in detail the process in the secure printing process 102 (Step S205) after the secure printing process 102 receives the encryption data.

After the secure printing process 102 receives the encryption data from the user authentication process 104, in Step S500, the process in the secure printing process 102 is started. In Step S501, the secure printing process 102 searches the received encryption data for the delimiter and separates the encrypted access ticket AT from the encrypted secret information. The data size is stored in a predetermined header of the encryption data in some terminal configurations. In such a case, the encrypted access ticket AT is separated from the encrypted secret information based on the data size.

Since the secure printing process 102 has its own encryption key, the secure printing process 102 can decrypt the access ticket AT encrypted with the encryption key of the secure printing process 102. In Step S501, the secure printing process 102 decrypts the encrypted access ticket AT with its own encryption key.

In Step S502, the secure printing process 102 determines whether the decryption succeeds. If the decryption fails, the secure printing process 102 proceeds to Step S507 and stops the subsequent processes based on the determination that login authentication of the user fails. Manipulation of the encryption data can be detected in the decryption.

If the secure printing process 102 determines in Step S502 that the decryption succeeds, then in Step S503, the secure printing process 102 extracts the information stored in the access ticket AT. The information extracted from the access ticket AT includes the secret key (Jk) generated by the authentication server 101 and the access right information specific to the user. A timestamp may be included in the access ticket AT in order to prevent a reply attack against the encryption data.

In Step S504, the secure printing process 102 tries to decrypt the encrypted secret information with the secret key (Jk) extracted from the access ticket AT. The secret key (Jk) used in this step is generated by the authentication server 101. When an authenticated user logs into the user authentication process 104, an encryption key (Jk) that is the same as the encryption key (Jk) generated by the user authentication process 104 in the encryption of the secret information should be generated (assumption of the user authentication) and the decryption should succeed. Accordingly, in Step S505, the secure printing process 102 determines whether the encrypted secret information is decrypted.

If the decryption succeeds, the above assumption is verified and the secure printing process 102 supposes that the user is properly authenticated by the authentication server 101. If the decryption fails in Step S505, the user logging in the user authentication process 104 can be different from the intended user for the authentication server 101. Accordingly, in Step S507, the secure printing process 102 determines that the login authentication of the user fails, and ignores the received request for restarting the processing.

For example, a checksum of the data can be used to determine whether the decryption of the encryption data succeeds. This technique has already been established as part of the encryption algorithm and it is possible to determine whether the decryption of the encryption data succeeds by this technique.

If the secure printing process 102 succeeds in the decryption of the secret information and properly receives the secret information, in Step S506, the secure printing process 102 processes the secret information based on the access right information specific to the user, extracted in advance from the access ticket AT. According to this embodiment, the suspended print job is restarted, the encrypted page description language (PDL) data is decrypted, and the decrypted data is transmitted to a PDL controller and is printed. In Step S508, the process in the secure printing process 102 is finished.

The authentication server 101 has the password PW of the user and the encryption key of the secure printing process 102, which are registered in advance. According to this embodiment, it is assumed that no vulnerability exists in the registration of the password PW and the encryption key in the authentication server 101. However, high vulnerability actually exists in the process of registering the password PW of the user in the authentication server 101 and the process of registering the encryption key of the resource (service process). This is because any attack against the authentication server 101 can result in a threat of leakage of the information concerning the password PW and the encryption key.

The following two countermeasures are taken against such a threat. The first countermeasure is a method in which the authentication server 101 is physically isolated so that only an administrator can access the authentication server 101 (operational countermeasure). When it is difficult to physically isolate the authentication server 101, only information specific to the user or resource (service process) may be stored in a directory server (not shown) that is physically isolated, and the authentication server 101 may be accessed only through an LDAP server.

The second countermeasure is a method in which a pair of a public key and a secret key in a public key cryptosystem is generated in advance for the secure printing process 102 as the encryption key to be registered in the authentication server 101, only the public key in the pair is stored in the authentication server 101, and the secret key is stored only in first service process B 102.

According to the second method, the secret key is not transmitted across the network. In addition, since the public key is stored in the authentication server 101, it is extremely difficult to infer the secret key from any leaked public key because of the characteristics of the public key encryption algorithm. In a system taking the second countermeasure, the access ticket AT generated by the authentication server 101 is encrypted with the public key of the first service process B 102 by the authentication server 101 and is decrypted with the secret key by the secure printing process 102.

Instead of the encryption key of the service process registered in advance in the authentication server 101, a digital certificate based on X.509, which is standard specifications of the digital certificate defined by the International Telecommunication Union (ITU), may be used.

According to this embodiment, credentials shared between the multiple service processes running on the terminal device and the user authentication process performing the user authentication in the terminal device for secure communication are independently verified in the terminal device and the user authentication process, and the credentials generated by the terminal device are encrypted into a mode that is indecipherable to the user authentication process.

In the interprocess secure communication system having the structure described above, the processing request issued from the user authentication process is encrypted and the encrypted request is transmitted to the corresponding service process, so that the security for the information is ensured between the processes. Since the data itself is encrypted and transmitted without building a logical encryption communication channel as in the SSL or the TSL, the security for the information can be ensured even in an asynchronous communication between the processes.

Since the user authentication process receives the random number from the authentication server and generates the encryption key used for the encryption of the information by using the random number and the user password input by the user, any malicious service process or user authentication process cannot select or generate its own encryption key. Hence, the reliability of the secret key (Jk) used in the encryption of the information can be improved.

Since the generation of the encryption key and the generation of the information to be transmitted to the service process are continuously and integrally performed, it is difficult for any malicious user authentication process to manipulate the information or generate Rouge data. Accordingly, an attack against another service process by a malicious user authentication process or service process can be foiled.

Each service process decrypts the encryption data received from the user authentication process with the encryption key extracted from the access ticket AT, so that the service process can determine that the encryption key used in the decryption is the same as the encryption key used by the user authentication process if the decryption succeeds. Accordingly, each service process can infer that the user password input by the user for logging in the user authentication process is an authorized user password registered in advance in the authentication server. Consequently, the service process can determine that the user logging into the user authentication process is an authorized user registered in the authentication server. This determination corresponds to the user authentication.

Other Embodiments of the Present Invention

Various devices operated in accordance with programs stored in a computer (the CPU or a micro processing unit (MPU)) in an apparatus or a system connected to the various devices, to which computer program codes of software for realizing the functions of the above embodiments are supplied, are within the scope of the present invention.

The program code itself of the software realizes the functions of the above embodiments. The present invention is embodied by the computer program itself and means, for example, a storage medium storing the program codes, for supplying the program codes to the computer. Storage media recording the program codes include a flexible disk, a hard disk, an optical disc, a magneto-optical disk, a compact-disc read only memory (CD-ROM), a magnetic tape, a nonvolatile memory card, and a ROM.

The computer that executes the supplied program codes realizes the functions of the above embodiments. In addition, when the program codes realizes the functions of the above embodiments in cooperation with the OS or another application running on the computer, the program codes themselves are within the scope of the present invention.

After the supplied program codes are stored in a memory that is provided in a function expansion board included in the computer or in a function expansion unit connected to the computer, the CPU or the like in the function expansion board or the function expansion unit can execute all or part of the actual processing based on the instructions in the program codes to realize the functions of the embodiments described above.

According to the embodiments described above, in multiple service applications operating on a common platform independent of the OS, it is possible to ensure the security of the information transmitted and received in the interprocess communication in each service application.

Furthermore, it is possible to resolve security problems, such as spoofing. For example, it is possible to prevent an illegal service application from executing a request for restarting a suspended print job in an MFP, in which multiple service processes run and to which a service process can be freely added later through a dynamic link, to achieve a secure printing function.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-023969 filed Jan. 30, 2004, which is hereby incorporated by reference herein.

What is claimed is:

1. A secure communication method performed in a system including a terminal device and an authentication server, the terminal device having at least one service process supplying a service to other terminal devices and a user authentication process performing authentication of a user, which processes run on the terminal device, the authentication server having an encryption key of the service process registered therein in advance, the secure communication method comprising:

obtaining, from the user at the terminal device, a user identification and a password for the user;

transmitting, from the terminal device to the authentication server, a request for an access ticket including the user identification and identification of a selected service process which is one of the at least one service process;

upon receipt of the request for the access ticket, generating, at the authentication server, a random number, and a first secret key generated using the random number and the user identification, the generation of the first secret key being performed independently of the user authentication process performed at the terminal device;

generating, at the authentication server, the access ticket including at least the first secret key and access control information;

encrypting, at the authentication server, the access ticket with the encryption key of the selected service process;

transmitting, from the authentication server to the selected service process on the terminal device, the encrypted access ticket and the random number;

generating, by the user authentication process at the terminal device, a second secret key generated using the random number and the password of the user;

encrypting, by the authentication process, processing information indicating a processing request issued to the selected service process using the second secret key;

providing, by the authentication process in the terminal device to the selected service process, the encrypted processing information and the encrypted access ticket;

decrypting, using the encryption key of the selected service process, by the selected service process, the encrypted access ticket provided by the authentication process; and decrypting using the first secret key included in the decrypted access ticket, by the selected service process, the encrypted processing information provided by the authentication process; and determining, by the selected service process, whether authentication by the authentication process is successful based on whether decryption for the encrypted processing information by the selected service process was successful, wherein, upon successful authentication by the authentication process, the processing request indicated by the decrypted processing information is handled by the selected service process based on the access control information included in the decrypted access ticket.

2. The secure communication method according to claim 1, wherein a public key of the service process, generated based on a public key cryptosystem, is used as the encryption key of the service process, to be registered in advance in the authentication server.

3. The secure communication method according to claim 1, wherein a digital certificate is substituted for the encryption key of the service process, to be registered in advance in the authentication server.

* * * * *